J. WHITE.
Globe-Holder.
No. 162,731. Patented April 27, 1875.
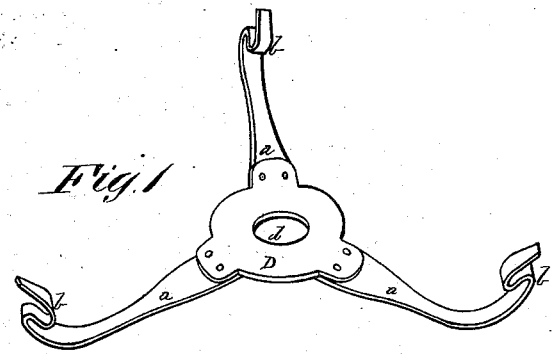
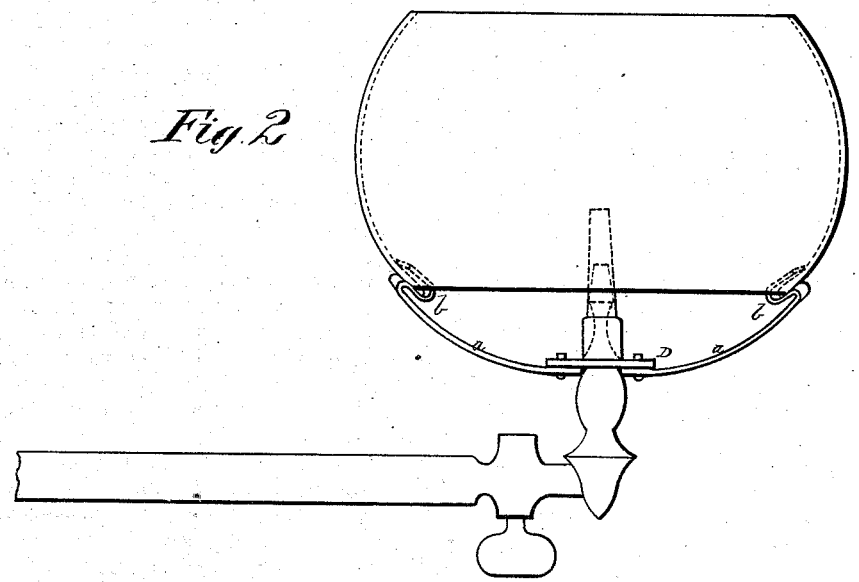

UNITED STATES PATENT OFFICE.

JOSEPH WHITE, OF PHILADELPHIA, PENNSYLVANIA.

IMPROVEMENT IN GLOBE-HOLDERS.

Specification forming part of Letters Patent No. 162,731, dated April 27, 1375; application filed March 6, 1875.

*To all whom it may concern:*

Be it known that I, JOSEPH WHITE, of Philadelphia, in the county of Philadelphia and State of Pennsylvania, have invented certain new and useful Improved Globe-Holder; and I do hereby declare the following to be a full, clear, and exact description of the invention, such as will enable others skilled in the art to which it pertains to make and use it, reference being had to the accompanying drawings, which form part of this specification, in which—

Figure 1 is a perspective of the holder. Fig. 2 is a side elevation of a burner and globe with my improved holder applied.

My invention has for its object to provide an elastic support or holder for globes. My invention accordingly consists of a holder formed with arms of spring-brass, or equivalent material, said arms being made with hooks or catches for embracing the lower edge or flange around the mouth or lower opening of the globe.

Referring to the accompanying drawing, *a a a* are arms, formed of spring-brass or equivalent material, and made with curved ends *b b b*, forming hooks, catches, or seats for the globe. These arms are to be fastened to the burner, in any suitable manner, as by riveting to a disk, D, having a central aperture, *d*. The globe may be firmly fixed in position in this holder by springing in the arms *a a a*, which, on being released, will exert their elastic force outwardly, thus dispensing wholly with screws.

A great advantage in this improved holder, aside from its simplicity and slight cost, consists in the fact that it permits the expansion of the globe from heat without producing breakage. Where rigid arms are employed, and the globe is screwed in fast, a fracture is likely to occur as soon as the heat from the lighted gas produces an expansion of the glass. By making the arms *a a a* separate in the first instance, and afterward securing them in position, as already described, they may be manufactured with but slight waste, whereas if they and the disk D, or an equivalent center, were all formed in one piece considerable loss would be incurred.

What I claim as my invention is—

The improved globe-holder, having the spring-arms *a*, curved upwardly and outwardly, and terminating in S-shaped hooks, bent inwardly and depending, so that their ends shall impinge on the inner surface of the globe, as shown.

In testimony that I claim the foregoing, I have hereunto set my hand this 4th day of March, 1875.

JOSEPH WHITE.

Witnesses:
MOSES VEALE,
M. DANL. CONNOLLY.